US007653540B2

(12) United States Patent
Sato

(10) Patent No.: US 7,653,540 B2
(45) Date of Patent: Jan. 26, 2010

(54) SPEECH SIGNAL COMPRESSION DEVICE, SPEECH SIGNAL COMPRESSION METHOD, AND PROGRAM

(75) Inventor: Yasushi Sato, Nagareyama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 906 days.

(21) Appl. No.: 10/545,427

(22) PCT Filed: Mar. 26, 2004

(86) PCT No.: PCT/JP2004/004304

§ 371 (c)(1),
(2), (4) Date: Aug. 12, 2005

(87) PCT Pub. No.: WO2004/088634

PCT Pub. Date: Oct. 14, 2004

(65) Prior Publication Data

US 2006/0167690 A1 Jul. 27, 2006

(30) Foreign Application Priority Data

Mar. 28, 2003 (JP) ............................ 2003-090045

(51) Int. Cl.
*G10L 17/00* (2006.01)

(52) U.S. Cl. ....................... 704/249; 704/221; 704/231; 704/243; 704/258

(58) Field of Classification Search ................. 704/249, 704/221, 231, 243, 258
See application file for complete search history.

(56) References Cited

U.S. PATENT DOCUMENTS 3,946,167 A * 3/1976 Schultz ....................... 369/144
4,661,915 A * 4/1987 Ott ............................ 704/254
5,617,507 A * 4/1997 Lee et al. .................... 704/200
5,715,363 A 2/1998 Tamura et al.

(Continued)

FOREIGN PATENT DOCUMENTS

GB 2 004 443 3/1979

(Continued)

OTHER PUBLICATIONS

International Search Report of Jul. 13, 2004 for PCT/JP2004/004304.

(Continued)

*Primary Examiner*—Qi Han
(74) *Attorney, Agent, or Firm*—Eric J. Robinson; Robinson Intellectual Property Law Office, P.C.

(57) ABSTRACT

The present invention provides a speech signal compression device which allows a storage capacity of data representing speech to be efficiently compressed. In the present invention, a computer C1 operates with respect to speech data to be compressed into speech data for each phoneme on the basis of phoneme labeling data, to unify the time length of a unit pitch section for each of the divided speech data into the same value, thereby creating a pitch waveform and creating a sub-band data representing variation in time of spectrum components of the pitch waveform signal. Also, this sub-band data is compressed so as to match a condition designated by a table for compression, and the compressed data is further encoded in entropy to output the entropy coded data.

4 Claims, 11 Drawing Sheets

U.S. PATENT DOCUMENTS

| | | | | |
|---|---|---|---|---|
| 5,987,413 | A * | 11/1999 | Dutoit et al. | 704/267 |
| 7,039,584 | B2 * | 5/2006 | Gournay et al. | 704/221 |
| 2002/0111794 | A1 * | 8/2002 | Yamamoto et al. | 704/200 |
| 2002/0143541 | A1 | 10/2002 | Kondo | |
| 2002/0184024 | A1 * | 12/2002 | Rorex | 704/255 |
| 2003/0130848 | A1 * | 7/2003 | Sheikhzadeh-Nadjar et al. | 704/260 |
| 2004/0220801 | A1 | 11/2004 | Sato | |

FOREIGN PATENT DOCUMENTS

| | | |
|---|---|---|
| JP | 56-067899 | 6/1981 |
| JP | 01-244499 | 9/1989 |
| JP | 03-233500 | 10/1991 |
| JP | 2931059 | 8/1999 |
| JP | 2002-251196 | 9/2002 |
| JP | 2002-287784 | 10/2002 |
| WO | WO 03/019530 | 3/2003 |

OTHER PUBLICATIONS

International Preliminary Report on Patentability dated Oct. 13, 2005 for PCT/JP2004/004304, Eng.

Supplementary European Search Report dated Jan. 23, 2007 for 04723803.5, Eng.

Office Action (Application No. 2003-090045) Dated Nov. 4, 2008, Eng.

Office Action (Application No. 200480008663.2) Dated Nov. 28, 2008, Eng.

* cited by examiner

PRIORITY DATA

| | |
|---|---|
| 0.0 | 68.0 |
| 100.0 | 50.0 |
| 150.943396 | 25.870000 |
| 301.886792 | 14.850000 |
| 452.830189 | 10.720000 |
| 603.773585 | 8.500000 |
| 754.716981 | 7.100000 |
| 905.660377 | 6.110000 |
| 1056.603774 | 5.370000 |
| 1207.547170 | 4.790000 |
| 1358.490566 | 4.320000 |
| . . . . . . . . . | . . . . . . . . . . . |

FIG. 3

COMPRESSION RATE DATA

| | |
|---|---|
| a | 1.00 |
| i | 1.00 |
| u | 1.00 |
| e | 1.00 |
| o | 1.00 |
| s | 0.12 |
| t | 0.10 |
| N | 0.56 |
| ch | 0.12 |
| ...... | |
| ...... | |
| ...... | |
| ...... | |
| t | 0.12 |
| k | 0.20 |
| h | 0.12 |

FIG. 6

PHONEME LABELING DATA

| | | |
|---|---|---|
| 00 | 0.20 | silB_ |
| 0.21 | 0.31 | t+a |
| 0.32 | 0.39 | t-a+k |
| 0.40 | 0.46 | a-k+a |
| 0.47 | 0.55 | k-a+z |
| 0.56 | 0.63 | a-z+e |
| 0.64 | 0.73 | z-e+k |
| 0.74 | 0.79 | e-k+i |
| 0.80 | 0.87 | k-i+m |
| 0.88 | 0.93 | i-m+a |
| 0.94 | 1.01 | m-a+ch |
| 1.02 | 1.17 | a-ch+i |
| 1.18 | 1.36 | ch-i+k |
| 1.37 | 1.64 | i-k+o_ |
| 1.65 | 1.85 | k-o+u_ |
| 1.86 | 1.88 | o-u+b_ |
| 1.89 | 1.95 | u-b+a_ |
| 1.96 | 2.10 | b-a+N_ |
| 2.11 | 2.25 | a-N___ |
| 2.26 | 2.49 | sp____ |
| 2.50 | 2.60 | m+a___ |
| 2.61 | 2.76 | m-a+e__ |
| 2.94 | 3.14 | silE___ |

. . . . . . . . . . . . . . . . . . . . . . .

SPEECH SIGNAL COMPRESSION DEVICE, SPEECH SIGNAL COMPRESSION METHOD, AND PROGRAM

TECHNICAL FIELD

The present invention relates to a speech signal compression device, a speech signal compression method and a program.

BACKGROUND ART

The present invention relates to a speech signal compression device, a speech signal compression technique and a program.

Recently, a speech synthesis method for converting text data and the like to speech has been used in the field of car navigation, for example.

In speech synthesis, for example, words, basic blocks and modification relations among the basic blocks included in text data are identified, and the way of reading the sentence is identified based on the identified words, basic blocks and modification relations. Then, the waveform, the duration and the pitch (fundamental frequency) pattern of phonemes to constitute speech are determined based on the phonogram sequence indicating the identified way of reading. Then, the waveform of speech indicating the entire sentence including kanjis and kanas is determined based on the result of the determination, and speech with the determined waveform is outputted.

In the above-mentioned speech synthesis method, in order to identify a speech waveform, a speech dictionary is searched in which speech data indicating waveforms or spectral distribution of speeches have been accumulated. The speech dictionary is required to have a great number of speech data accumulated therein in order to make synthesized speech natural.

In addition, when this method is applied to a device required to be downsized, such as a car navigation device, it is generally necessary to downsize a storage device for storing a speech dictionary to be used by the device. When the size of the storage device is decreased, decrease of the storage capacity is generally unavoidable.

Accordingly, in order to enable a speech dictionary with a sufficient amount of speech data included therein to be stored in a storage device with a small storage capacity, data compression of speech data has been used to reduce the data capacity of one speech datum (see National Publication of International Patent Application No. 2000-502539, for example).

DISCLOSURE OF THE INVENTION

However, when speech data indicating speech uttered by a person is compressed with the use of an entropy-coding method, which is a method of compressing data based on regularity of the data (specifically, arithmetic coding, Huffman coding and the like), compression efficiency is low because speech data does not necessarily have clear periodicity as a whole.

That is, a waveform of speech uttered by a personal is composed of sections showing regularity with various lengths of time and sections without clear regularity, as shown in FIG. 11(*a*), for example. It is also difficult to find clear regularity from the spectral distribution of such a waveform. Therefore, if entropy coding is performed for the entire speech data indicating speech uttered by a person, the compression efficiency is low.

Furthermore, for example, as shown in FIG. 11(*b*), when speech data is separated at regular intervals of time length, the separation timing (the timing denoted by "T1" in FIG. 11(*b*)) generally does not correspond to the boundary between two adjoining phonemes (the timing denoted by "T0" in FIG. 11(*b*)). Consequently, it is difficult to find regularity common to all the individual separated portions (for example, the portions denoted by "P1" and "P2" in FIG. 11(*b*)), and therefore, the compression efficiency of each of these portions is also low.

Furthermore, pitch fluctuation has been a problem. A pitch is liable to be influenced by human emotion or consciousness. A pitch can be regarded as a constant period to some extent, but actually, subtle fluctuation is caused. Therefore, when the same speaker utters the same words (phonemes) corresponding to multiple pitches, the pitch length is generally not constant. Accordingly, a waveform indicating one phoneme often does not show accurate regularity, and therefore the efficiency of compression by means of entropy coding is often low.

The present invention has been made in consideration of the above situation, and its object is to provide a speech signal compression device, a speech signal compression method and a program for enabling efficient compression of the data capacity of data indicating speech.

In order to achieve the above object, a speech signal compression device according to a first aspect of the present invention is characterized in comprising:

division-according-to-phoneme means for acquiring a speech signal indicating a speech waveform to be compressed, and dividing the speech signal into portions indicating waveforms of individual phonemes;

a filter for filtering the divided speech signal to extract a pitch signal;

phase adjustment means for separating the speech signal into sections based on the pitch signal extracted by the filter and adjusting, for each of the sections, the phase based on correlation relation with the pitch signal;

sampling means for determining, for each of the sections for which the phase has been adjusted by the phase adjustment means, the sampling length based on the phase and generating a sampling signal by performing sampling in accordance with the sampling length;

speech signal processing means for processing the sampling signal to be a pitch waveform signal based on the result of the adjustments by the phase adjustment means and the value of the sampling length;

sub-band data generation means for generating sub-band data indicating change with time of spectral distribution of each of the phonemes based on the pitch waveform signal; and compression-according-to-phoneme means for performing data compression of the sub-band data in accordance with a predetermined condition specified for a phoneme indicated by the sub-band data.

The compression-according-to-phoneme means may be configured by:

means for rewritably storing a table which specifies a condition of data compression to be performed for sub-band data indicating each phoneme; and means for performing data compression of sub-band data indicating each phoneme in accordance with a condition specified by the table.

The compression-according-to-phoneme means may perform data compression of sub-band data indicating each phoneme by nonlinearly quantizing the data so that the compression rate to satisfy a condition specified for the phoneme is reached.

Priority may be specified for each spectral component of sub-band data; and the compression-according-to-phoneme means may perform data compression of sub-band data by quantizing each of spectral components of the sub-band data in a manner that a spectral component with a higher priority is quantized with a higher resolution.

The compression-according-to-phoneme means may perform data compression of sub-band data by changing the sub-band data so that spectral distribution after deletion of a predetermined spectral component is shown.

A speech signal compression device according to a second aspect of the present invention is characterized in comprising:

speech signal processing means for acquiring a speech signal indicating a waveform of speech, and processing the speech signal to be a pitch waveform signal by substantially equalizing phases of multiple sections obtained by separating the speech signal, each of the multiple sections corresponding to a unit pitch of the speech;

sub-band data generation means for generating sub-band data indicating change with time of spectral distribution of each of the phonemes based on the pitch waveform signal; and compression-according-to-phoneme means for performing data compression of each of portions indicating individual phonemes of the sub-band data in accordance with a predetermined condition specified for a phoneme indicated by the portion.

A speech signal compression device according to a third aspect of the present invention is characterized in comprising:

means for acquiring a signal indicating a speech waveform or change with time of spectral distribution of speech; and means for performing data compression of each of portions indicating individual phonemes of the acquired signal in accordance with a predetermined condition specified for a phoneme indicated by the portion.

A speech signal compression method according to a fourth aspect of the present invention is characterized in that:

a signal indicating a speech waveform or change with time of spectral distribution of speech is acquired; and data compression is performed for each of portions indicating individual phonemes of the acquired signal in accordance with a predetermined condition specified for a phoneme indicated by the portion.

A program according to a fifth aspect of the present invention is characterized in causing a computer to function as:

means for acquiring a signal indicating a speech waveform or change with time of spectral distribution of speech; and means for performing data compression of each of portions indicating individual phonemes of the acquired signal in accordance with a predetermined condition specified for a phoneme indicated by the portion.

BRIEF DESCRIPTION OF THE DRAWINGS

FIG. 3 is a diagram for showing data structure of compression rate data;

FIG. 6 is a diagram for showing data structure of phoneme labeling data;

BEST MODE FOR CARRYING OUT THE INVENTION

Embodiments of the present invention will be now described with reference to drawings.

First Embodiment

Figure 1:
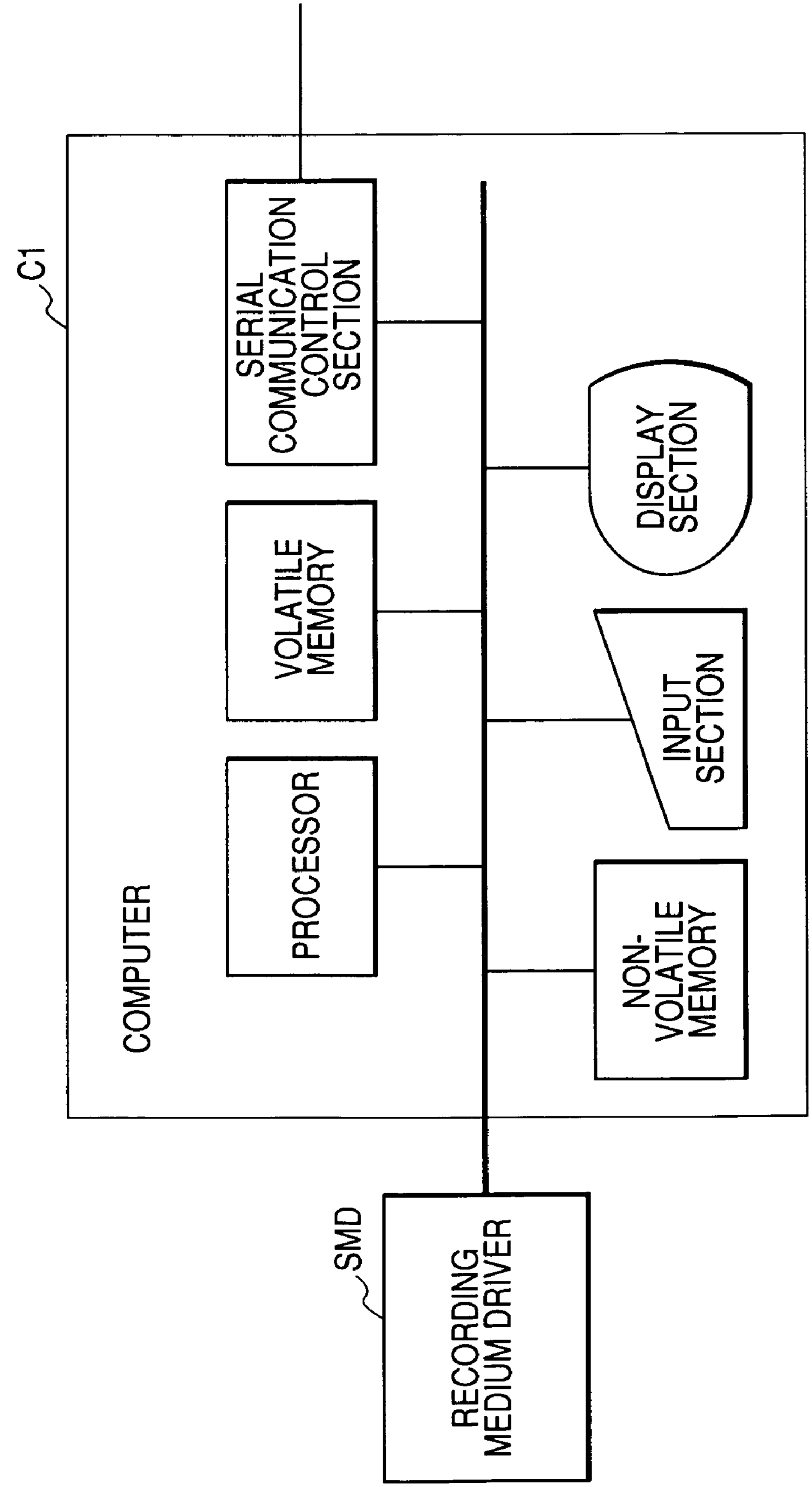
FIG. 1 is a block diagram showing the configuration of a speech data compressor according to a first embodiment of the present invention.

FIG. 1 shows the configuration of a speech data compressor according to a first embodiment of the present invention. As shown in the figure, this speech data compressor is configured by a recording medium driver (a flexible disk drive and a CD-ROM drive and the like) SMD for reading data recorded on a recording medium (for example, a flexible disk, CD-R (compact disc-recordable and the like) and a computer C1 connected to the recording medium driver SMD.

As shown in the figure, the computer C1 is constituted by a processor configured by a CPU (central processing unit), a DSP (digital signal processor) or the like, a volatile memory configured by a RAM (random access memory) or the like, a non-volatile memory configured by a hard disk or the like, and an input section configured by a keyboard and the like, a display section configured by a liquid crystal display or the like, a serial communication control section configured by a USB (universal serial bus) interface circuit or the like, for controlling serial communication with the outside, and the like.

In the computer C1, a speech data compression program is stored in advance. The processings to be described later is performed by executing this speech data compression program.

In the computer C1, a compression table is stored in a manner that it can be rewritten in accordance with operation of a operator. The compression table includes priority data and compression rate data.

The priority data is data for specifying the height of quantization resolution for each spectral component of speech data to be processed by the computer C1 in accordance with the speech data compression program.

Figures 2A, 2B:
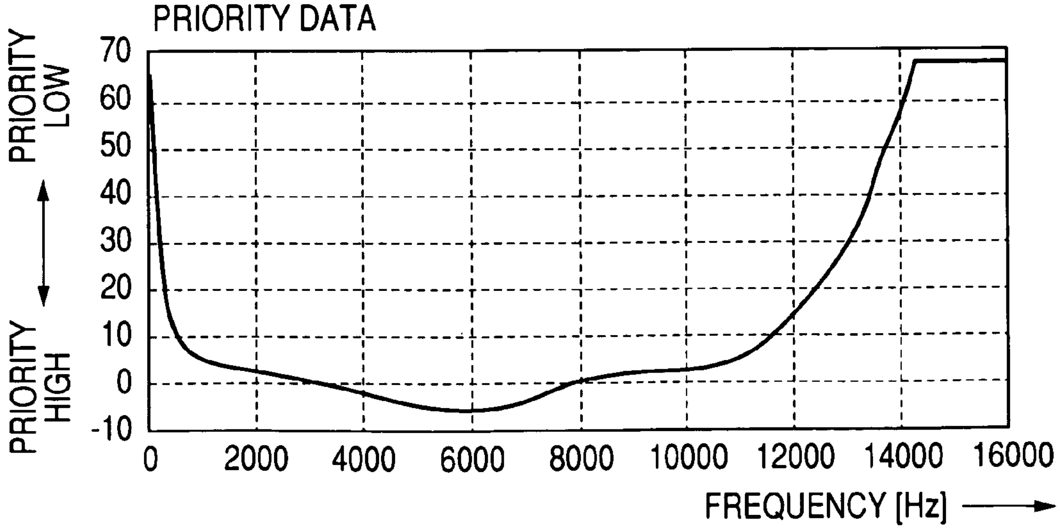
FIG. 2(*a*) is a diagram for showing data structure of priority data, and FIG. 2(*b*) shows the priority data in the form of a graph.

Specifically, the priority data is only required to have the data structure shown in FIG. 2(*a*). Alternatively, it may consist of data showing the graph shown in FIG. 2(*b*), for example.

The priority data shown in FIG. 2(*a*) or 2(*b*) includes frequencies of spectral components and priorities specified for the spectral components in association with each other. The computer C1 executing the speech data compression program quantizes a spectral component with a lower priority value with a higher resolution (with a larger number of bits), as described later.

The compression rate data is data for specifying the target of the compression rate of the below-described sub-band data to be generated by the computer C1 through the below-described processings, as a relative value among phonemes for each phoneme. Specifically, the compression rate data is only required to have the data structure shown in FIG. 3, for example.

The compression rate data shown in FIG. 3 includes symbols identifying phonemes and target values of relative compression rates of the phonemes in association with each other. That is, for example, in the compression rate data shown in FIG. 3, the target value of the relative compression rate of a phoneme "a" is specified as 1.00°, and the target value of the relative compression rate of a phoneme "ch" is specified as "0.12". This means that the compression rate of sub-band data indicating the phoneme "ch" is specified to be 0.12 times as high as the compression rate of sub-band data indicating the phoneme "a". Accordingly, in accordance with the compression rate data shown in FIG. 3, if processing is performed so that the compression rate of the sub-band data indicating the phoneme "a" is to be 0.5 (that is, the data amount of the sub-band data after compression is to be 50% of the data amount before compression), for example, then processing should be performed so that the compression rate of the sub-band data indicating the phoneme "ch" is to be 0.06.

The compression table may further comprise data indicating which spectral components should be deleted from speech data to be processed by the computer C1 in accordance with the speech data compression program (hereinafter referred to as deletion band data).

First Embodiment

Operation

Figure 4:
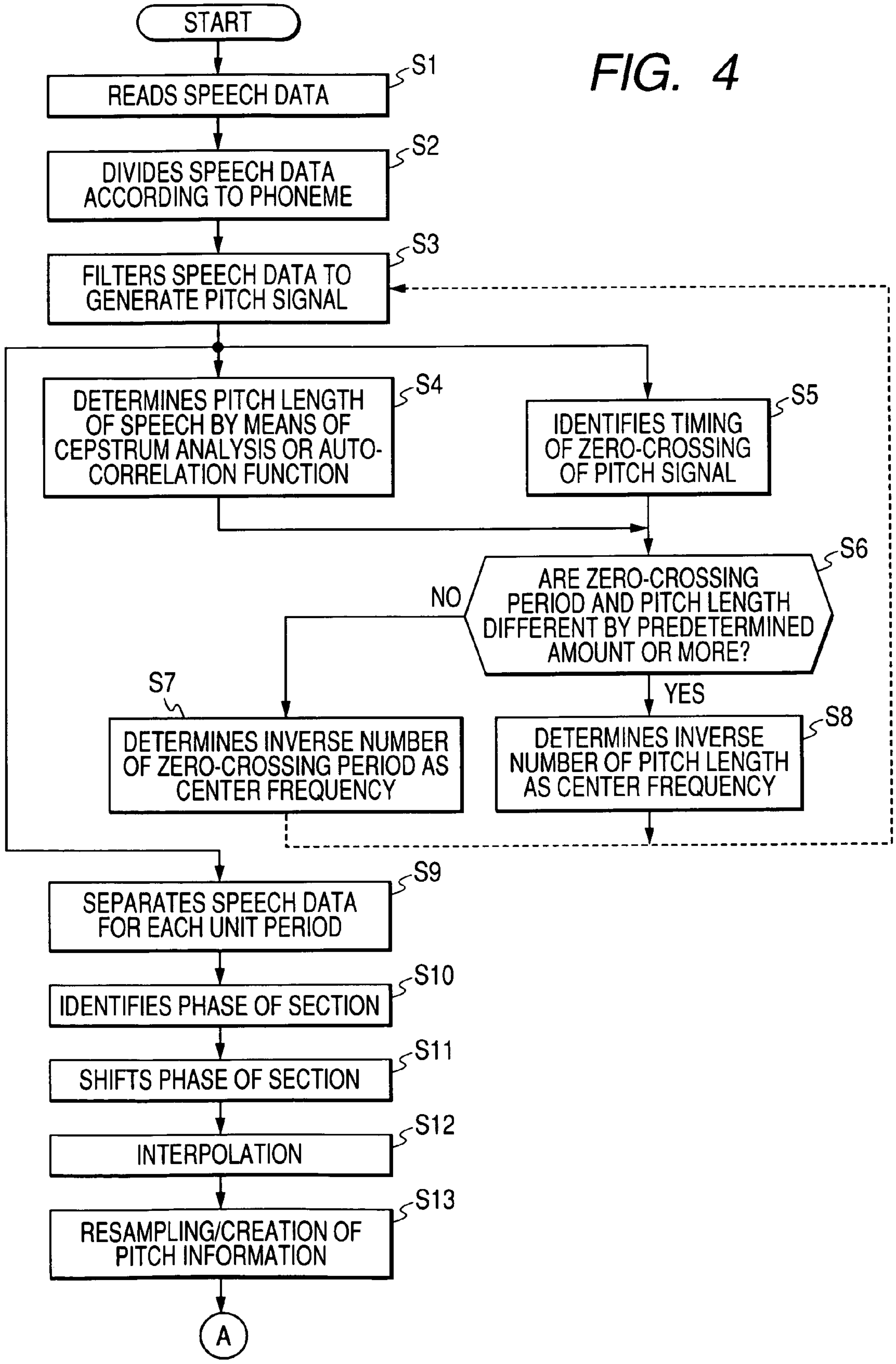
FIG. 4 is a diagram for showing the first half of the operation flow of the speech data compressor in FIG. 1.
Figure 5:
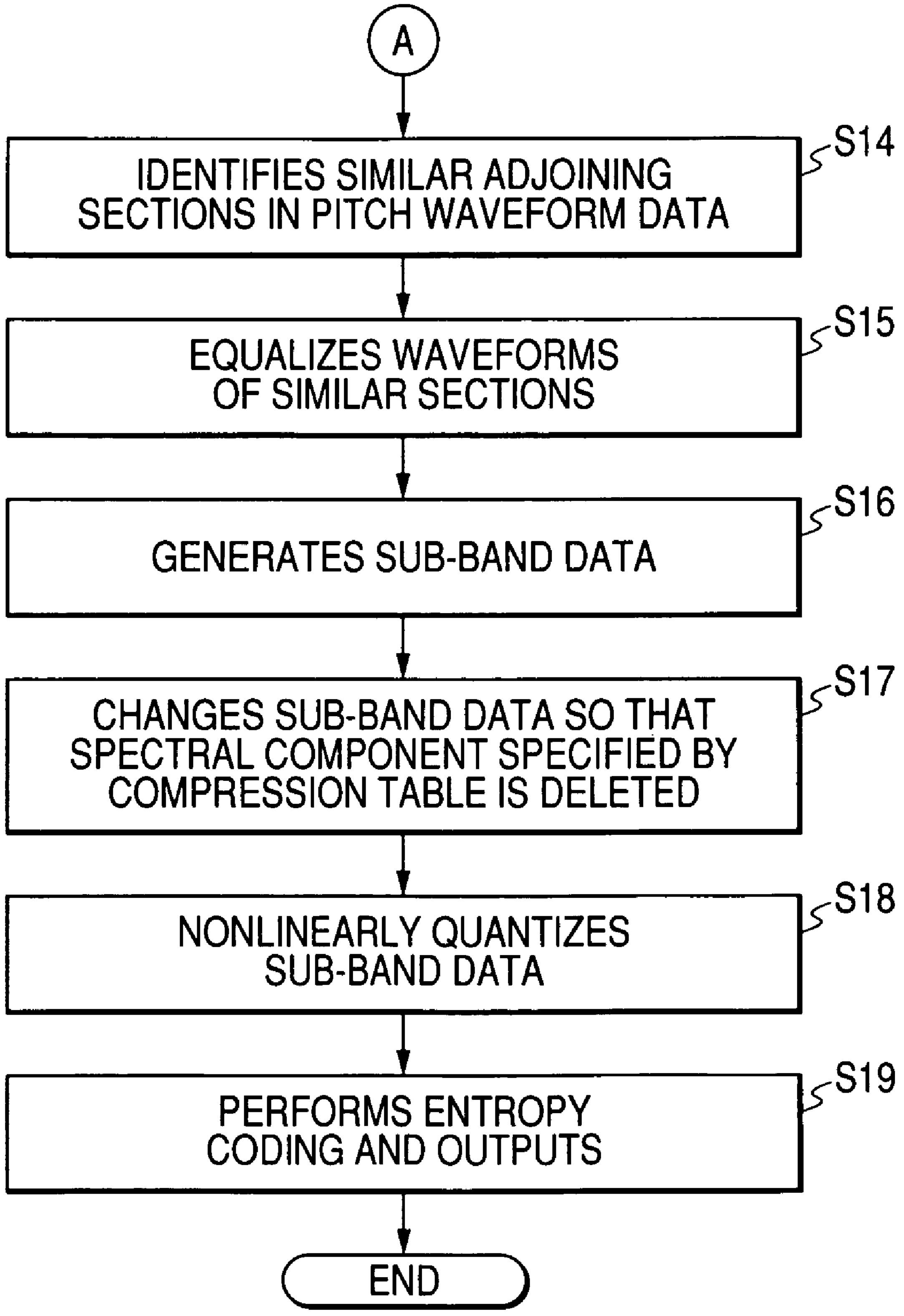
FIG. 5 is a diagram for showing the last half of the operation flow of the speech data compressor in FIG. 1.

Next, the operation of this speech data compressor will be described with reference to FIGS. 4 and 5. FIGS. 4 and 5 show the flow of the operation of the speech data compressor in FIG. 1.

When a user sets a recording medium on which speech data indicating a speech waveform and phoneme labeling data to be described later are recorded in the recording medium driver SMD and instructs the computer C1 to activate a speech data compression program, the computer C1 starts processing of the speech data compression program. The computer C1 first reads the speech data from the recording medium via the recording medium driver SMD (FIG. 4, step S1).

The speech data is assumed to be in the form of a PCM (pulse code modulation) modulated digital signal, for example, and indicate speech for which sampling has been performed at a constant cycle sufficiently shorter than the speech pitch.

Meanwhile, the phoneme labeling data is data showing which part of the waveform indicated by the phoneme data indicates which phoneme and having the data structure shown in FIG. 6, for example.

For example, the phoneme labeling data in FIG. 6 shows that the part corresponding to 0.20 seconds from the beginning of the waveform indicated by the speech data indicates a silent condition; that the part from after 0.20 seconds up to 0.31 seconds indicates the waveform of a phoneme "t" (limited to the case where the succeeding phoneme is "a"); that the part from after 0.31 seconds up to 0.39 seconds indicates the phoneme "a" (limited to the case where the preceding phoneme is "t" and the succeeding phoneme is "k"); and the like.

Returning to the description of the operation, the computer C1 then divides the speech data read from the recording medium into portions each of which indicates one phoneme (step S2). The computer C1 may identify each portion indicating a phoneme by interpreting the phoneme labeling data read at step S1.

Next, the computer C1 generates filtered speech data (a pitch signal) by filtering each of speech data obtained by dividing the speech data for respective phonemes (step S3). The pitch signal is assumed to consist of data in a digital form having substantially the same sampling interval as the sampling interval of the speech data.

The computer C1 determines a characteristic of filtering to be performed to generate the pitch signal by performing feedback processing based on the pitch length to be described later and the time when the instantaneous value of the pitch signal is 0 (the time of zero-crossing).

That is, the computer C1 performs, for example, cepstrum analysis or analysis based on auto-correlation function for each speech data to identify the fundamental frequency of speech indicated by the speech data, and determines an absolute value of the inverse number of the fundamental frequency (that is, the pitch length) (step S4). (Alternatively, the computer C1 may identify two fundamental frequencies by performing both of the cepstrum analysis and the analysis based on auto-correlation function to determine the average of absolute values of the inverse numbers of the two fundamental frequencies as the pitch length.)

Specifically, the following is performed in the cepstrum analysis. First, the strength of the speech data is converted to a value which is substantially equal to a logarithm (the base of the logarithm is arbitrary) of the original value. Then, the spectrum (that is, the cepstrum) of the speech data for which the value has been converted is determined by means of the fast Fourier transform method (or any other method for generating data indicating the result of performing Fourier transform of a discrete variable). And then, the minimum value among frequencies providing the maximum cepstrum value is identified as the fundamental frequency.

Meanwhile, specifically, the following is performed in the analysis based on auto-correlation function. First, an auto-correlation function r(1) indicated by the right-hand side of a formula 1 is identified with the use of the read speech data. Then, the minimum value exceeding a predetermined lower limit is identified as the fundamental frequency from among frequencies providing the maximum value of a function obtained by Fourier transforming the auto-correlation function r(1) (a periodgram).

$$r(1) = \frac{1}{N}\sum_{t=0}^{N-1-1}\{x(t+1)\cdot x(t)\}$$ [Formula 1]

(where the total number of samples of speech data is denoted by N; and the value of the α-th sample from the top of the speech data is denoted by X(α))

The computer C1 identifies the timing when the time of zero-crossing of the pitch signal comes (step S5). The computer C1 then determines whether or not the pitch length and the zero-crossing period of the pitch signal are different from each other by a predetermined amount (step S6). If it is determined that they are not, the above-described filtering is performed with such a bandpass filter characteristic as uses the inverse number of the zero-crossing period as the center frequency (step S7). On the contrary, if it is determined that they are different from each other by a predetermined amount or more, then the above-described filtering is performed with such a bandpass filter characteristic as uses the inverse number of the pitch length as the center frequency (step S8). In any of the cases, it is desirable that the passband width for filtering is such that the upper limit of the passband is always within twice as high as the fundamental frequency of speech indicated by speech data.

Next, the computer C1 separates the speech data read from the recording medium at the timing when the boundary of a unit period (for example, one period) of the generated pitch signal comes (specifically, at the timing when pitch signals zero-cross) (step S9). Then, for each of sections obtained by the separation, correlation is determined between variously changed phases of the speech data within the section and the pitch signal within the section, and the phase of the speech data with the highest correlation is identified as the phase of the speech data within the section (step S10). Then, the phase of each section of the speech data is shifted so that the sections are substantially in the same phase (step S11).

Specifically, for each section, the computer C1 determines, for example, a value cor denoted by the right-hand side of a formula 2 by variously changing a value of φ which indicates the phase (where φ is an integer of 0 or more). A value Ψ of φ which provides the maximum value cor is identified as the value indicating the phase of the speech data within the section. As a result, a value of a phase with the highest correlation with the pitch signal is determined for the section. The computer C1 then shifts the phase of the speech data within the section by (−Ψ).

$$cor = \sum_{i=1}^{n} \{f(i+f) \cdot g(i)\}$$ [Formula 2]

(where the number of samples within a section is denoted by n; the value of the β-th sample from the top of the speech data within the section is denoted by f(β)); and the value of the γ-th sample from the top of the pitch signal within the section is denoted by g(γ))

Figure 7A:
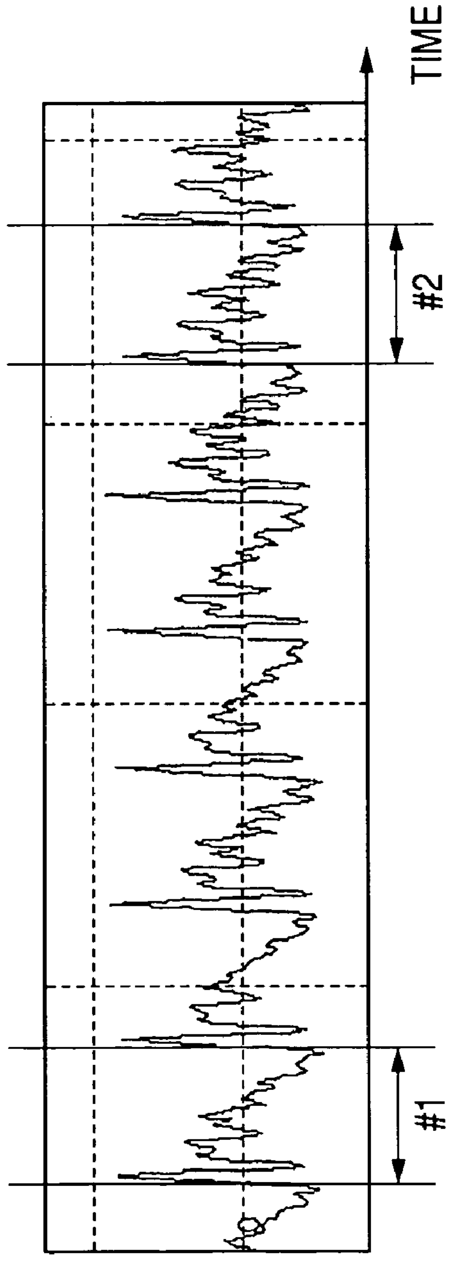
FIGS. 7(*a*) and (*b*) are graphs showing a waveform of speech data before phase shifting, and FIG. 7(*c*) is a graph showing a waveform of the speech data after phase shifting.
Figure 7B:
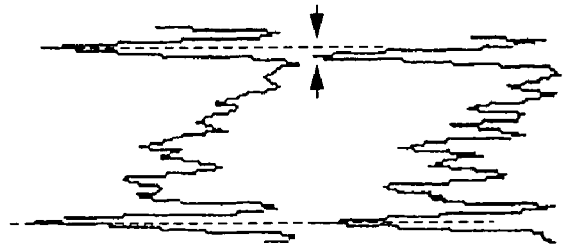
Figure 7C:
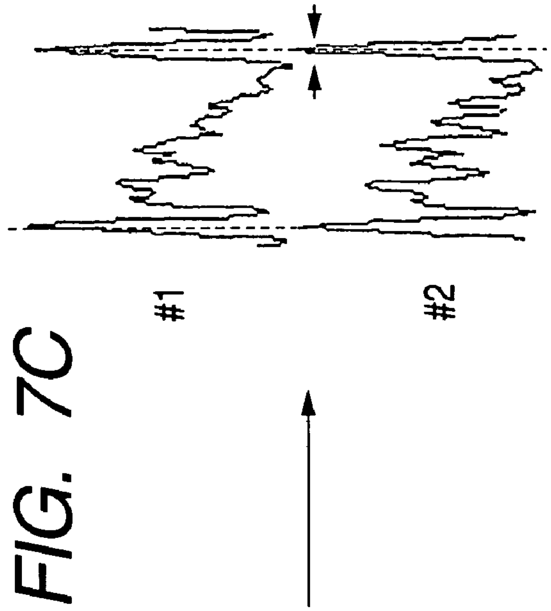

FIG. 7 (*c*) shows an example of a waveform indicated by data obtained by shifting the phase of speech data as described above. In the waveform of speech data before phase shifting shown in FIG. 7(*a*), two sections denoted by "#1" and "#2" have different phases due to influence of pitch fluctuation as shown in FIG. 7(*b*). By comparison, the phases of the two sections #1 and #2 of the waveform indicated by the speech data after phase shifting correspond to each other because the influence of pitch fluctuation has been eliminated, as shown in FIG. 7(*c*). As shown in FIG. 7(*a*), the value at the starting point of each section is close to 0.

It is desirable that the time length of a section almost corresponds to one pitch. As the section is longer, a problem is inclined to be caused that the number of samples within the section increases and, therefore, the data amount of the pitch waveform data increases, or that a sampling interval is increased and speech indicated by pitch waveform data is inaccurate.

Next, the computer C1 performs Lagrange's interpolation for the phase-shifted speech data (step S12). That is, data indicating a value of interpolation between samples of the phase-shifted speech data by means of the Lagrange's interpolation method is generated. The speech data after interpolation is configured by the phase-shifted speech data and the Lagrange's interpolation data.

Next, the computer C1 performs sampling again (resampling) for each section of the speech data after interpolation. It also generates information about the number of samples, which is data indicating the original number of samples for each section (step S13). The computer C1 is assumed to perform resampling in a manner that the number of samples for each section of pitch waveform data is almost equal to each other and that resampling is performed at regular intervals in the same section.

If the sampling interval for the speech data read from the recording medium is known, the information about the number of samples functions as information indicating the original time length of a section corresponding a unit pitch of the speech data.

Next, for each speech data for which the time length of its sections have been equalized at step S13 (that is, pitch waveform data), the computer C1 identifies combination of sections each of which corresponds to one pitch and which show high correlation above a predetermined level with one another, if any (step S14). Then, for each such identified combination, data of each of sections belonging to the same combination is replaced with data of one of these sections to equalize the waveforms of these sections (step S15).

The degree of correlation among sections each of which corresponds to one pitch may be determined, for example, by determining a correlation coefficient between waveforms of two sections each of which corresponds to one pitch and being based on the value of each determined correlation coefficient. Alternatively, it may be determined by determining the difference between two sections each of which corresponds to one pitch and based on an effective value or average value of the determined difference.

Next, the computer C1 uses the pitch waveform data for which the processings up to step S15 have been performed to generate sub-band data which indicates change with time of the spectrum of speech indicated by the pitch waveform data for each phoneme (step S16). Specifically, the sub-band data may be generated by performing orthogonal transform such as DCT (discrete cosine transform) for the pitch waveform data, for example.

Next, if deletion band data is included in a compression table stored in the computer C1, the computer C1 changes each sub-band data generated through the processings up to step S15 in a manner that the strength of a spectral component specified by the deletion band table is 0 (step S17).

Next, the computer C1 nonlinearly quantizes each sub-band data to perform data compression of the sub-band data (step S18). That is, sub-band data is generated which corresponds to what is obtained by quantizing a value obtained by nonlinearly compresses the instantaneous value (specifically, a value obtained by substituting the instantaneous value for a concave function, for example) of each frequency component indicated by each sub-band data for which processings up to step S16 (or to step S17) have been performed.

At step S18, the computer C1 determines a compression characteristic (correspondence relation between the content of sub-band data before nonlinear quantization and the content of the sub-band data after nonlinear quantization) so that the compression rate of the sub-band data is to be a value determined by the product of a predetermined overall target value and a relative target value specified by the compression rate data for the phoneme indicated by the sub-band data. The computer C1 may store the above-mentioned overall target value in advance or may acquire it in accordance with operation of an operator.

The compression characteristic may be determined, for example, by determining the compression rate of the sub-band data based on the sub-band data before nonlinear quantization and the sub-band data after nonlinear quantization and then performing feedback processing or the like based on the determined compression rate.

That is, for example, it is determined whether or not the compression rate determined for sub-band data indicating some phoneme is larger than the product of a relative target value of the compression rate for the phoneme and the overall target value. If it is determined that the determined compression rate is larger than the product, then a compression characteristic is determined so that the compression rate is lower than the present rate. On the contrary, if it is determined that the determined compression rate is equal to or below the product, then a compression characteristic is determined so that the compression rate is higher than the present rate.

At step S18, the computer C1 quantizes spectral components included in the sub-band data so that a spectral component with a lower value of priority, which is shown by the priority data stored in the computer C1, with a higher resolution.

As a result of performing processings up to step S14, the speech data read from the recording medium has been converted to sub-band data indicating the result of nonlinear quantization of spectral distribution of each phoneme constituting speech indicated by the speech data. The computer C1 performs entropy coding (specifically, arithmetic coding, Huffman coding and the like, for example) for the sub-band data, and outputs the entropy-coded sub-band data (compressed speech data) and the information about the number of samples generated at step S13 to the outside via its own serial communication control section (step S19).

Figure 8A:
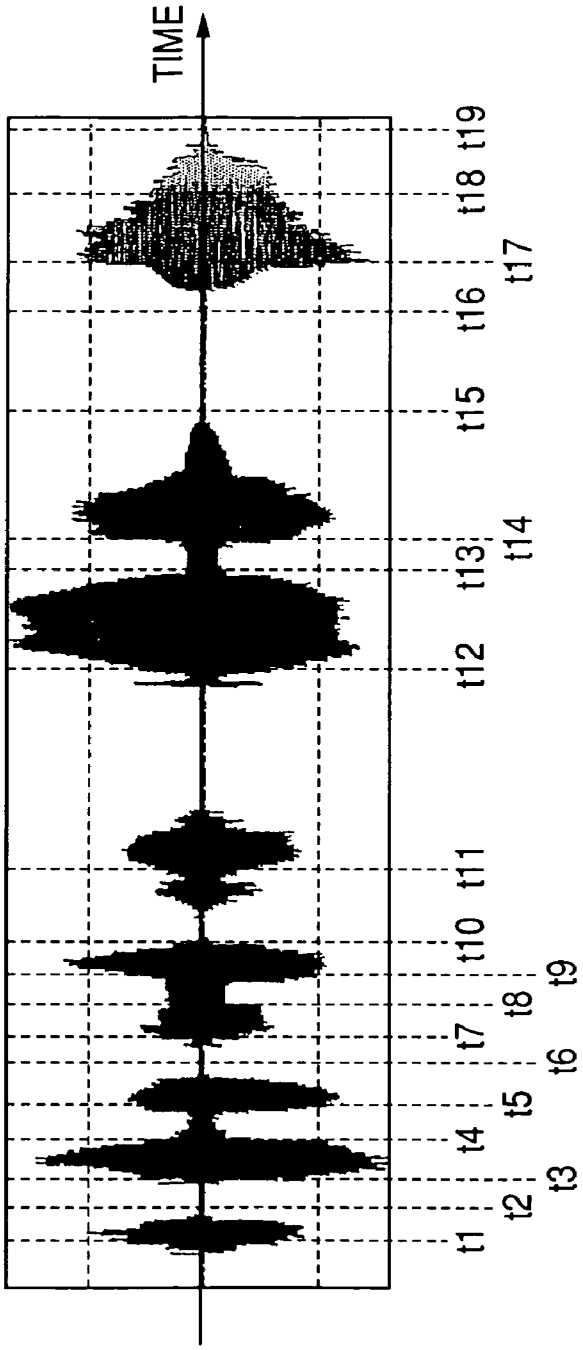
FIG. 8(*a*) is a graph showing timings for a pitch waveform data divider in FIG. 1 or FIG. 9 to separate the waveform in FIG. 11(*a*), and FIG. 8(*b*) is a graph showing timings for the pitch waveform data divider in FIG. 1 or FIG. 9 to separate the waveform in FIG. 11(*b*)
Figure 8B:
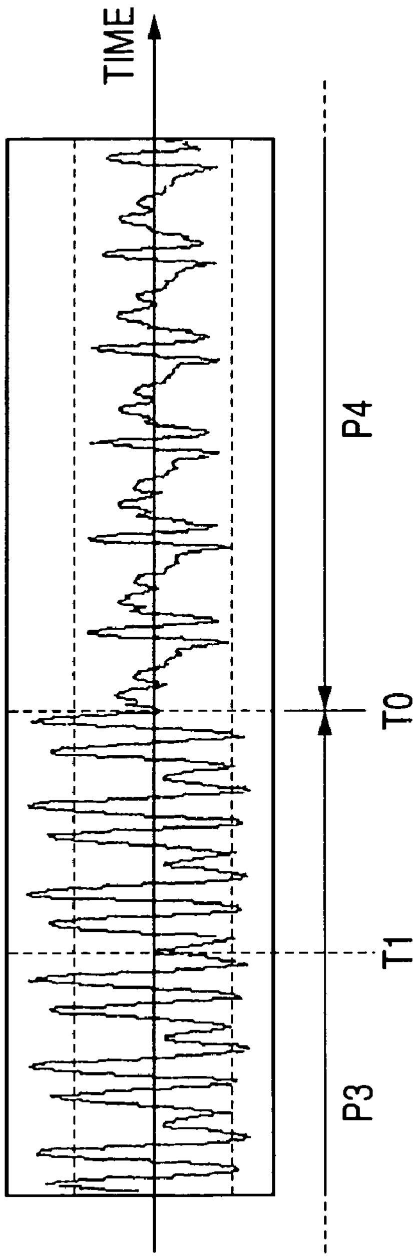
Figure 11A:
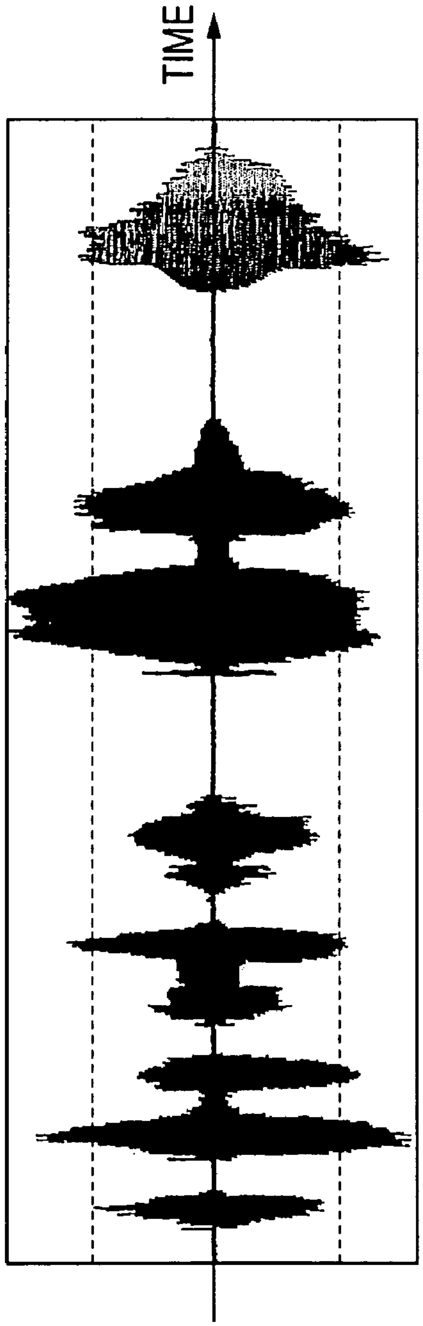
FIG. 11(*a*) is a graph showing an example of a waveform of speech uttered by a person, and FIG. 11(*b*) is a graph for illustrating the timings to separate a waveform in a prior-art technique.
Figure 11B:
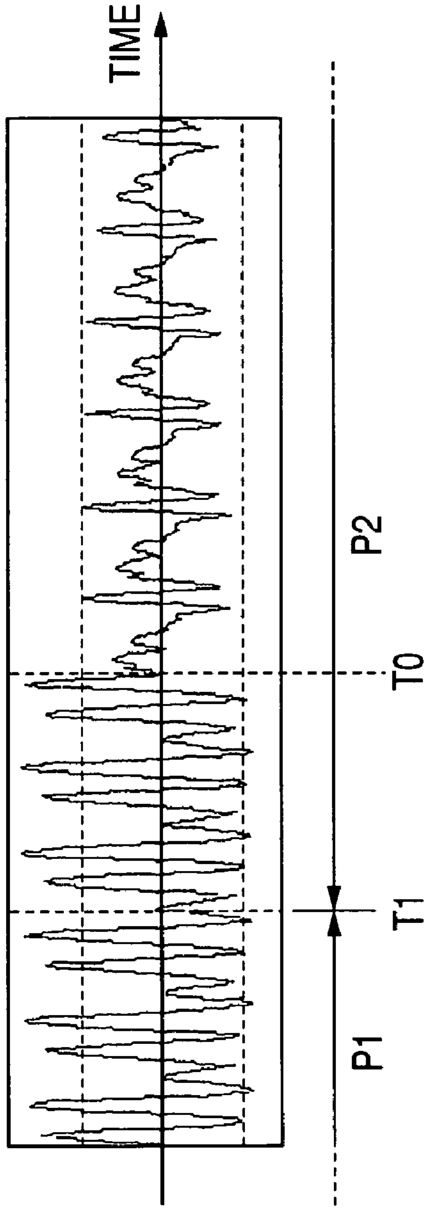

Each of speech data obtained as a result of dividing original speech data having the waveform shown in FIG. 11(*a*) by the processing of step S16 described above is, for example, to be each of speech data obtained by dividing the original speech data at the timings "t1" to "t19", which are boundaries between different phonemes (or the end of speech) as shown in FIG. 8(*a*), unless there is no error in the content of the phoneme labeling data.

If speech data having the waveform shown in FIG. 11(*b*) is divided into multiple portions by the processing of step S16, "T0", a boundary between two adjoining phonemes is correctly selected as a separation timing as shown in FIG. 8(*b*) unless there is no error in the content of the phoneme labeling data, unlike the way of separation shown in FIG. 11(*b*). Accordingly, it is possible to prevent waveforms of multiple phonemes from being mixed in the waveform of each portion obtained by this processing (for example, the waveform of a portion denoted by "P3" or "P4" in FIG. 8(*b*)).

The divided speech data is processed to be pitch waveform data, and then converted to sub-band data. The pitch waveform data is speech data for which the time lengths of sections each of which corresponds to a unit pitch have been standardized and from which influence of pitch fluctuation has been eliminated. Accordingly, each sub-band data generated with the use of the pitch waveform data accurately indicates change with time of the spectral distribution of each phoneme indicated by the original speech data.

Since the divided phoneme data, the pitch waveform data and the sub-band data have the characteristic described above, deletion of a particular spectral component or a process of performing nonlinear quantization with a different compression characteristic for each phoneme and for each spectral component can be accurately performed. Furthermore, entropy coding of nonlinearly quantized sub-band data can be efficiently performed. Thus, it is possible to efficiently perform data compression without deteriorating speech quality of the original speech data.

Deletion of a spectral component or nonlinear quantization is performed in accordance with a condition shown in a compression table for each phoneme or each frequency. Accordingly, by variously rewriting the content of the compression table, it is possible to perform refined and suitable data compression appropriate for the characteristic of a phoneme or the band characteristic of human acoustic sense.

For example, a fricative has a characteristic that, even if it is significantly distorted, it is difficult to acoustically recognize the abnormality, in comparison with phonemes of other kinds. Accordingly, high compression (data compression with a low-value compression rate) of a fricative has no problems, in comparison with other kinds of phoneme.

As for a phoneme with a waveform close to a sine wave, such as a vowel sound, speech quality is not deteriorated much even if spectral components other than the sine wave are deleted or quantized with a resolution lower than that for the spectral components of the sine wave.

As for a component below dozens of hertz which is difficult to be heard by a person or a component above dozens of kilohertz, speech quality is not acoustically deteriorated much even if the component is quantized with a resolution lower than that for other components or deleted.

By variously rewriting the content of the compression table, it is possible to perform, for speeches uttered by multiple speakers, refined and suitable data compression appropriate for the speech characteristic of each of the speakers.

Since the original time length of each section of pitch waveform data can be identified with the use of information about the number of samples, it is possible to easily restore original speech data by performing IDCT (inverse DCT) for compressed speech data to acquire data indicating a waveform of speech and then restoring the time length of each section of this data to the time length of the original speech data.

The configuration of this speech data compressor is not limited to the configuration described above.

For example, the computer C1 may acquire speech data or phoneme labeling data which is serially transmitted from the outside via the serial communication control section. Speech data or phoneme labeling data may be acquired from the outside via a communication line such as a telephone line, a dedicated line and a satellite line. In this case, the computer C1 is only required to be provided with a modem, a DSU (data service unit) and the like, for example. If speech or phoneme labeling data is acquired from any place other than the recording medium driver SMD, the computer C1 is not necessarily required to be provided with the recording medium driver SMD. Speech data and phoneme labeling data may be acquired separately via different paths.

The computer C1 may acquire and store a compression table from outside via a communication line or the like. Alternatively, it is also possible to set a recording medium on which a compression table is recorded in the recording medium driver SMD, and operate the input section of the computer C1 to cause the compression table recorded on the recording medium to be read and stored by the computer C1 via the recording medium driver SMD. The compression table is not necessarily required to include priority data.

The computer C1 may be provided with a speech collector constituted by a microphone, an AF amplifier, a sampler, an A/D (analog-to-digital) converter, a PCM encoder and the like. The speech collector may acquire speech data by amplifying a speech signal indicating speech collected by its microphone, sampling and A/D converting the speech signal, and then PCM modulating the speech signal for which sampling has been performed. The speech data to be acquired by the computer C1 is not necessarily required to be a PCM signal.

The computer C1 may write compressed speech data or information about the number of samples on a recording medium set in the recording medium driver SMD via the recording medium driver SMD, or may write it in an external storage device configured by a hard disk device or the like. In such cases, the computer C1 is only required to be provided with a recording medium driver and a control circuit such as a hard disk controller.

The computer C1 may output data indicating with which resolution each spectral component of sub-band data has been quantized by the processing of step S18, via the serial communication control section, or may write it on a recording medium set in the recording medium driver SMD via the recording medium driver SMD.

The method for dividing original speech data into portions indicating individual phonemes may be any method. For example, original speech data may be divided for phonemes in advance, or it may be divided after it is processed to be pitch waveform data. Alternatively, it may be divided after it is converted to sub-band data. Furthermore, it is also possible to analyze speech data, pitch waveform data or sub-band data to identify a section indicating each phoneme, and cut off the identified section.

The computer C1 may skip the processings of S16 and S17. In this case, data compression of pitch waveform data may be performed by nonlinearly quantizing each of portions of the pitch waveform data which indicate individual phonemes at step S18. Then, at step S19, the compressed pitch waveform data may be entropy-coded and outputted, instead of compressed sub-band data.

Furthermore, the computer C1 may not perform any one of the cepstrum analysis or the analysis based on auto-correlation function. In this case, the inverse number of the fundamental frequency determined by any one of the cepstrum analysis and the analysis based on auto-correlation function may be immediately treated as the pitch length.

Furthermore, the amount by which the computer C1 shifts the phase of speech data within each of sections of the speech data is not required to be $(-\Psi)$. For example, with $\delta$ as a real number common to all the sections, which indicates the initial phase, the computer C1 may shift the phase of the speech data by $(-\Psi+\delta)$ for each section. The position at which the computer C1 separates speech data of speech data is not necessarily required to be at the timing of zero-crossing of a pitch signal. For example, the position may be at the timing when the pitch signal is a predetermined value other than 0.

However, if the initial phase $\alpha$ is assumed as 0, and speech data is to be separated at the timing of zero-crossing of a pitch signal, the value at the starting point of each section is close to 0, and therefore, the amount of noise to be included in each section due to the separation of speech data into sections is decreased. The compression rate data may be data in which the compression rate of sub-band data indicating each phoneme is specified as an absolute value instead of a relative value (for example, a coefficient by which the overall target value is to be multiplied, as described above).

The computer C1 is not required to be a dedicated system. It may be a personal computer or the like. The speech data compression program may be installed in the computer C1 from a medium (a CD-ROM, an MO, a flexible disk or the like) in which the speech data compression program is stored. Alternatively, a pitch waveform extraction program may be uploaded to a bulletin board system (BBS) of a communication line and delivered via the communication line. It is also possible that a carrier wave is modulated with a signal indicating the speech data compression program, and the obtained modulated wave is transmitted. Then, a device which has received the modulated wave demodulates the modulated wave to restore the speech data compression program.

The speech data compression program can perform the above processings by being activated under the control of an OS similarly to other application programs and executed by the computer C1. If the OS takes on a part of the above processings, the part for controlling the processings may be eliminated from the speech compression program stored in the recording medium.

Second Embodiment

Next, a second embodiment of the present invention will be described.

Figure 9:
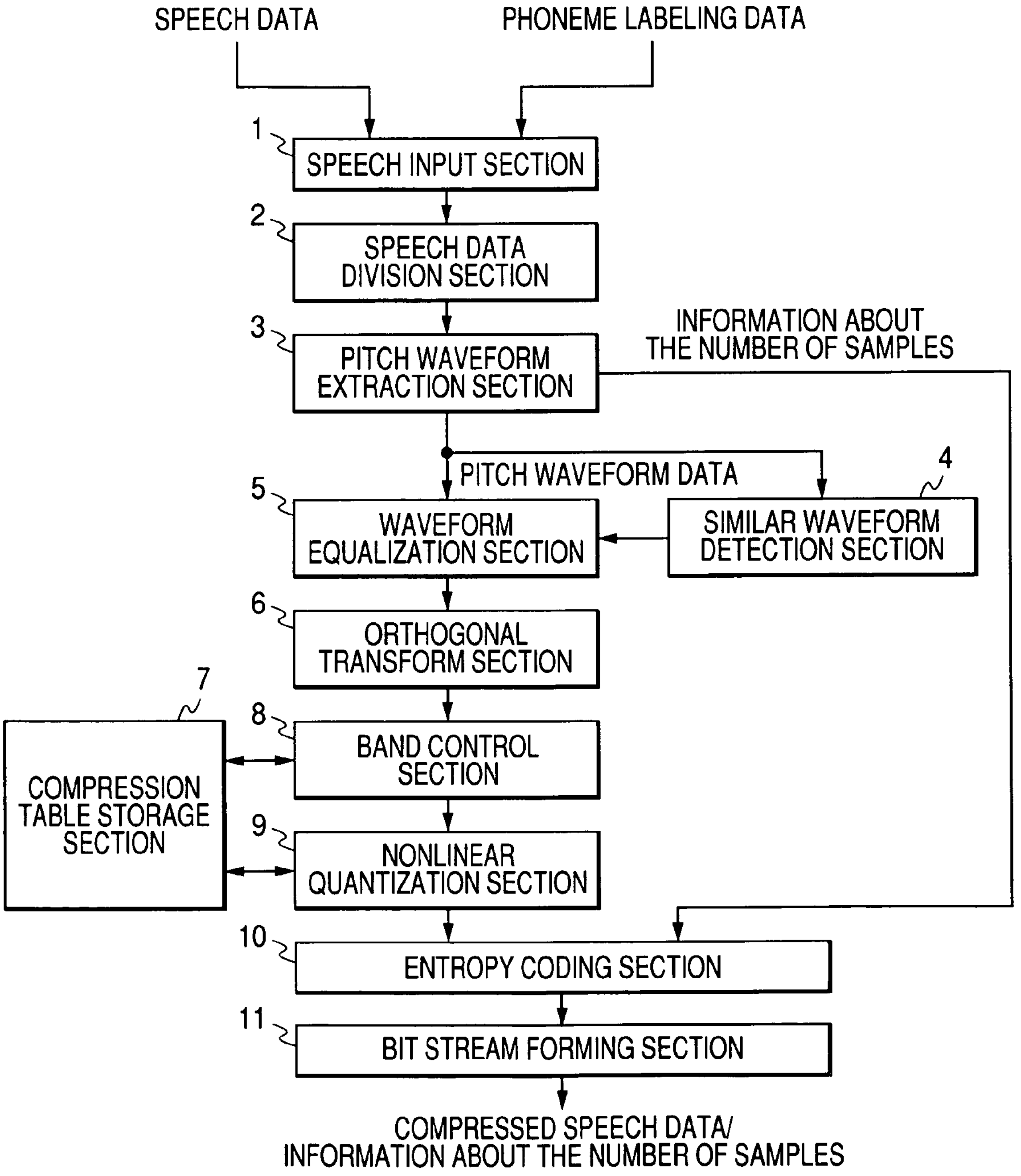
FIG. 9 is a block diagram showing the configuration of a speech data compressor according to a second embodiment of the present invention.

FIG. 9 shows the configuration of a speech data compressor according to the second embodiment of the present invention. As shown in the figure, this speech data compressor is configured by a speech input section 1, a speech data division section 2, a pitch waveform extraction section 3, a similar waveform detection section 4, a waveform equalization section 5, an orthogonal transform section 6, a compression table storage section 7, a band control section 8, a nonlinear quantization section 9, an entropy coding section 10 and a bit stream forming section 11.

The speech input section 1 is configured, for example, by a recording medium driver or the like similar to the recording medium driver SMD in the first embodiment.

The speech input section 1 acquires speech data indicating a waveform of speech and the above-stated phoneme labeling data, for example, by reading the data from a recording medium on which the data is recorded, and supplies the data to the speech data division section 2. The speech data is assumed to be in the form of a PCM-modulated digital signal and indicate speech for which sampling has been performed at a constant cycle sufficiently shorter than the speech pitch.

The speech data division section 2, the pitch waveform extraction section 3, the similar waveform detection section 4, the waveform equalization section 5, the orthogonal transform section 6, the band control section 8, the nonlinear quantization section 9 and the entropy coding section 10 are all configured by a processor such as a DSP and a CPU.

A part or all of the functions of the pitch waveform extraction section 3, the similar waveform detection section 4, the waveform equalization section 5, the orthogonal transform section 6, the band control section 8, the nonlinear quantization section 9 and the entropy coding section 10 may be performed by a single processor. When supplied with the speech data and phoneme labeling data from the speech input section 1, the speech data division section 2 divides the supplied speech data into portions each of which indicates each of phonemes constituting the speech indicated by the speech data and supplies the speech data to the pitch waveform extraction section 3. The speech data division section 2 is assumed to identify each of the portions indicating phonemes based on the content of the phoneme labeling data supplied from the speech input section 1.

The pitch waveform extraction section 3 further divides each of the speech data supplied from the speech data division section 2 into sections each of which corresponds to a unit pitch (for example, one pitch) of the speech indicated by the speech data. Then, by performing phase shifting and resampling of these sections, the pitch waveform extraction section 3 equalizes the time length and the phase of the sections so that they are substantially the same. The speech data for which the time lengths and phases of the sections have been equalized (pitch waveform data) is then supplied to the similar waveform detection section 4 and the waveform equalization section 5.

The pitch waveform extraction section 3 generates information about the number of samples indicating the original number of samples of each section of the speech data and supplies it to the entropy coding section 10.

Figure 10:
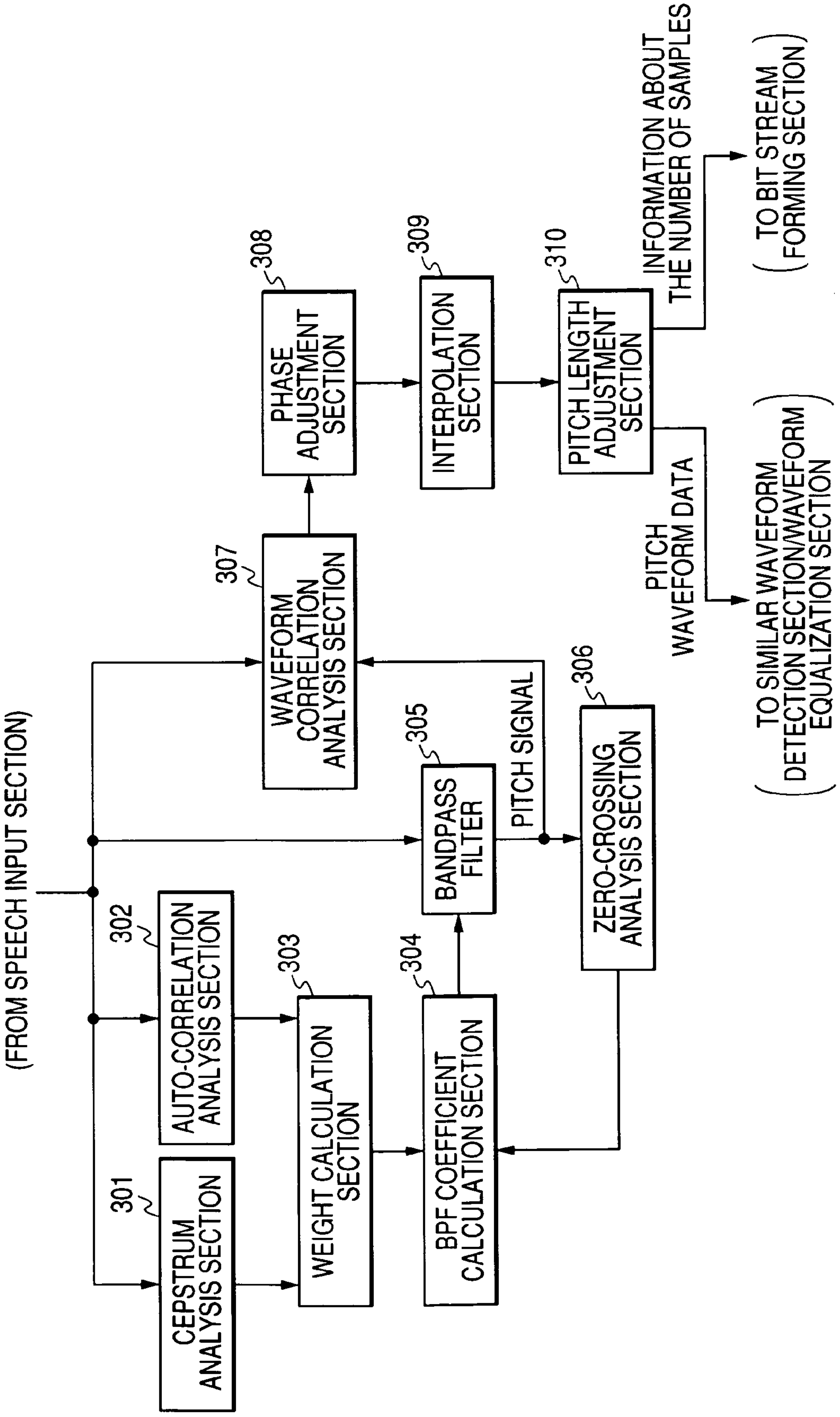
FIG. 10 is a block diagram showing the configuration of a pitch waveform extraction section in FIG. 9.

For example, as shown in FIG. 10, the pitch waveform extraction section 3 is functionally configured by a cepstrum analysis section 301, an auto-correlation analysis section 302, a weight calculation section 303, a BPF (bandpass filter) coefficient calculation section 304, a bandpass filter 305, a zero-crossing analysis section 306, a waveform correlation analysis section 307, a phase adjustment section 308, an interpolation section 309 and a pitch length adjustment section 310.

A part or all of the functions of the cepstrum analysis section 301, the auto-correlation analysis section 302, the weight calculation section 303, the BPF coefficient calculation section 304, the bandpass filter 305, the zero-crossing analysis section 306, the waveform correlation analysis section 307, the phase adjustment section 308, the interpolation section 309 and the pitch length adjustment section 310 may be performed by a single processor.

The pitch waveform extraction section 3 identifies the pitch length with the use of both of the cepstrum analysis and the analysis based on auto-correlation function.

That is, the cepstrum analysis section 301 first performs the cepstrum analysis for speech data supplied from the speech data division section 2 to identify the fundamental frequency of the speech indicated by the speech data, generates data indicating the identified fundamental frequency and supplies it to the weight calculation section 303.

Specifically, when supplied with the speech data from the speech data division section 2, the cepstrum analysis section 301 converts the strength of the speech data to a value which is substantially equal to the logarithm of the original value. (The base of the logarithm is arbitrary.)

Then, the cepstrum analysis section 301 determines the spectrum (that is, the cepstrum) of the speech data for which the value has been converted, by means of the fast Fourier transform method (or any other method for generating data indicating the result of performing Fourier transform of a discrete variable).

Then, the minimum value among frequencies providing the maximum cepstrum value is identified as the fundamental frequency, and data indicating the identified fundamental frequency is generated and supplied to the weight calculation section 303.

Meanwhile, when supplied with the speech data from the speech data division section 2, the auto-correlation analysis section 302 identifies the fundamental frequency of the speech indicated by the speech data based on the auto-correlation function of the waveform of the speech data, generates data indicating the identified fundamental frequency and supplies the data to the weight calculation section 303.

Specifically, when supplied with the speech data from the speech data division section 2, the auto-correlation analysis section 302 first identifies the auto-correlation function r(1) described above. Then, the minimum value above a predetermined lower limit is identified as the fundamental frequency from among frequencies providing the maximum value of the periodgram obtained as a result of Fourier transforming the identified auto-correlation function r(1), generates data indicating the identified fundamental frequency and supplies the data to the weight calculation section 303. When supplied with a total of two data indicating the fundamental frequency, one from the cepstrum analysis section 301 and one from the auto-correlation analysis section 302, the weight calculation section 303 determines the average of absolute values of the inverse numbers of the fundamental frequencies indicated by the two data. Then, data indicating the determined value (that is, the average pitch length) is generated and supplied to the BPF coefficient calculation section 304. When supplied with the data indicating the average pitch length from the weight calculation section 303 and a zero-crossing signal to be described later from the zero-crossing analysis section 306, the BPF coefficient calculation section 304 determines whether or not the average pitch length, the pitch signal and the zero-crossing period are different from one another by a predetermined amount or more, based on the supplied data and zero-crossing signal. If it is determined that they are not, the frequency characteristic of the bandpass filter 305 is controlled so that the inverse number of the zero-crossing period is to be the center frequency (the frequency at the center of the passband of the bandpass filter 305. On the contrary, if it is determined that they are different by the predetermined amount or more, the frequency characteristic of the bandpass filter 305 is controlled so that the inverse number of the average pitch length is to be the center frequency.

The bandpass filter 305 performs the function of an FIR (finite impulse response) type filter where the center frequency is variable.

Specifically, the bandpass filter 305 sets its own center frequency to a value in accordance with the control of the BPF coefficient calculation section 304. Then, the bandpass filter 305 filters the speech data supplied from the speech data division section 2, and supplies the filtered speech data (pitch signal) to the zero-crossing analysis section 306 and the waveform correlation analysis section 307. The pitch signal is assumed to consist of data in a digital form having substantially the same sampling interval as the sampling interval of the speech data.

It is desirable that the band width of the bandpass filter 305 is such that the upper limit of the passband of the bandpass filter 305 is always within twice as high as the fundamental frequency of speech indicated by speech data.

The zero-crossing analysis section 306 identifies the timing when the time at which the instantaneous value of the pitch signal supplied from the bandpass filter 305 is 0 (the time of zero-crossing) comes, and supplies a signal indicating the identified timing (zero-crossing signal) to the BPF coefficient calculation section 304. In this way, the length of the pitch of the speech data is identified.

However, the zero-crossing analysis section 306 may identify the timing when the time at which the instantaneous value of the pitch signal is a predetermined value other than 0 comes and supply a signal indicating the identified timing to the BPF coefficient calculation section 304 instead of a zero-crossing signal.

When supplied with the speech data from the speech data division section 2 and the pitch signal from the bandpass filter 305, the waveform correlation analysis section 307 separates the speech data at the timing when the boundary of a unit period (for example, one period) of the pitch signal comes.

Then, for each of sections obtained by the separation, correlation is determined between variously changed phases of the speech data within the section and the pitch signal within the section, and a phase of the speech data with the highest correlation is identified as the phase of the speech data within the section. In this way, the phase of the speech data is identified for each section.

Specifically, for example, the waveform correlation analysis section 307 identifies the above-stated value Ψ for each section, generates data indicating the value Ψ, and supplies the data to the phase adjustment section 308 as phase data indicating the phase of the speech data within the section. It is desirable that the time length of a section almost corresponds to one pitch.

When supplied with the speech data from the speech data division section 2 and the data indicating the phase Ψ of each section of the speech data from the waveform correlation analysis section 307, the phase adjustment section 308 equalizes the phases of the sections by shifting the phase of the speech data of each section by (−Ψ). Then, the phase-shifted data is supplied to the interpolation section 309.

The interpolation section 309 performs Lagrange's interpolation for the speech data (phase-shifted speech data) supplied from the phase adjustment section 308 and supplies it to the pitch length adjustment section 310.

When supplied with the speech data for which Lagrange's interpolation has been performed from the interpolation section Q1, the pitch length adjustment section 310 performs resampling of each section of the supplied speech data to equalize the time lengths of the sections so that they are substantially the same. Then, the speech data for which the time lengths of the sections have been equalized (that is, pitch waveform data) is supplied to the similar waveform detection section 4 and the waveform equalization section 5.

The pitch length adjustment section 310 generates information about the number of samples indicating the original number of samples of each section of this speech data (the number of samples of each section of this speech data when supplied from the speech data division section 2 to the pitch length adjustment section 310) and supplies it to the entropy coding section 10.

When supplied with each speech data for which the time lengths of the sections have been equalized (that is, pitch waveform data) from the pitch waveform extraction section 3, the similar waveform detection section 4 identifies combination of sections each of which corresponds to one pitch and which show high correlation above a predetermined level with one another, if any. Then, the identified combination is notified to the waveform equalization section 5.

The degree of correlation among sections each of which corresponds to one pitch may be determined, for example, by determining a correlation coefficient between waveforms of two sections each of which corresponds to one pitch and being based on the value of the determined correlation coefficient. Alternatively, it may be determined by determining difference between two sections each of which corresponds to one pitch and being based on the actual values or the average value of the differences.

When supplied with the pitch waveform data from the pitch waveform extraction section 3 and notified of the combination of sections each of which corresponds to one pitch and which shows high correlation above a predetermined level with one another by the similar waveform detection section 4, the waveform equalization section 5 equalizes waveforms within sections belonging to the combination notified by the similar waveform detection section 4 among the supplied pith waveform data. That is, for each notified combination, data of sections belonging to the same combination are replaced with data of any one of the sections. Then, the pitch waveform data for which waves have been equalized is supplied to the orthogonal transform section 6.

The orthogonal transform section 6 performs orthogonal transform such as DCT for the pitch waveform data supplied from the waveform equalization section 5 to generate the sub-band data described above. Then, the generated sub-band data is supplied to the band control section 8.

The compression table storage section 7 is configured by a volatile memory such as a RAM or a non-volatile memory such as an EEPROM (electrically erasable/programmable read only memory), a hard disk device and a flash memory. The compression table storage section 7 rewritably stores the above-stated compression table in accordance with operation by an operator, and causes at least a part of the compression table stored in the compression table storage section 7 to be read by the band control section 8 or the nonlinear quantization section 9 in response to access from the band control section 8 and the nonlinear quantization section 9.

The band control section 8 accesses the compression table storage section 7 to determine whether or not deletion band data is included in the compression table stored in the compression table storage section 7. If it is determined that the data is not included, then the sub-band data supplied from the orthogonal transform section 6 is immediately supplied to the nonlinear quantization section 9. On the contrary, if it is determined that the deletion band data is included, then the deletion band data is read, the sub-band data supplied from the orthogonal transform section 6 is changed so that the strength of the spectral component specified by the deletion band data is 0, and then the sub-band data is supplied to the nonlinear quantization section 9.

When supplied with the sub-band data from the band control section 8, the nonlinear quantization section 9 generates sub-band data corresponding to what is obtained by quantizing a value obtained by nonlinearly compressing the instantaneous value of each frequency component indicated by this sub-band data, and supplies the generated sub-band data (nonlinearly quantized sub-band data) to the entropy coding section 10.

The nonlinear quantization section 9 nonlinearly quantizes the sub-band data in accordance with a condition specified by the compression table stored in the compression table storage section 7. That is, the nonlinear quantization section 9 performs the nonlinear quantization with a compression characteristic so that the compression rate of the sub-band data is to be a value determined by the product of a predetermined overall target value and a relative target value specified by compression rate data included in the compression table for the phoneme indicated by the sub-band data. The nonlinear quantization section 9 quantizes each of spectral components included in the sub-band data in a manner that a spectral component with a smaller priority value, which is specified in priority data included in the compression table, is quantized with a higher resolution.

The overall target value may be stored in the compression table storage section in advance or may be acquired by the nonlinear quantization section 9 in accordance with operation by an operator.

The entropy coding section 10 converts the nonlinearly quantized sub-band data supplied from the nonlinear quantization section 9 and the information about the number of samples supplied from the pitch waveform extraction section 3 to entropy codes (for example, arithmetic codes or Huffman codes) and supplies them to the bit stream forming section 11 in association with each other.

The bit stream forming section 11 is configured by a serial interface circuit for controlling serial communication with the outside in conformity with a standard such as USB, and a processor such as a CPU.

The bit stream forming section 11 generates and outputs a bit stream indicating the entropy-coded sub-band data (compressed speech data) and the entropy-coded information about the number of samples supplied from the entropy coding section 10.

The compressed speech data outputted by the speech data compressor in FIG. 9 indicates the result of nonlinear quantization of spectral distribution of each of phonemes constituting speech indicated by speech data. This compressed speech data is also generated based on pitch waveform data, data in which the time lengths of sections each of which corresponds to a unit pitch have been standardized and from which influence by pitch fluctuation has been eliminated. Accordingly, change with time of the strength of each frequency component of speech can be accurately indicated.

The speech data division section 2 of this speech data compressor also separates speech data having the waveform shown in FIG. 11(*a*) at the timings "t1" to "t19" shown in FIG. 8(*a*), unless there is no error in the content of the phoneme labeling data. In the case of speech data having the waveform shown in FIG. 11(*b*), the boundary "T0" between two adjoining phonemes is correctly selected as a separation timing unless there is no error in the content of the phoneme labeling data, as shown in FIG. 8(*b*). Accordingly, it is possible to prevent waveforms of multiple phonemes from being mixed in the waveform of each portion obtained by the processing to be performed by the speech data division section 2.

Thus, this speech data compressor also accurately performs deletion of a particular spectral component or a process of nonlinear quantization with a different compression characteristic for each phoneme and for each spectral component. Furthermore, it also performs entropy coding of nonlinearly quantized sub-band data efficiently. Accordingly, it is possible to efficiently perform data compression without deteriorating speech quality of original speech data.

In this speech data compressor also, by variously rewriting the content of the compression table stored in the compression table storage section 7, it is possible to perform refined and suitable data compression appropriate for the characteristic of a phoneme or the band characteristic of human acoustic sense, and it is also possible to perform, for speeches uttered by multiple speakers, data compression appropriate for the speech characteristic of each of the speakers.

Since the original time length of each section of pitch waveform data can be identified with the use of information about the number of samples, it is possible to easily restore original speech data by performing IDCT for compressed speech data to acquire data indicating a waveform of speech and then restoring the time length of each section of this data to the time length in the original speech data.

The configuration of this speech data compressor is not limited the configuration described above.

For example, the speech input section 1 may acquire speech data or phoneme labeling data from the outside via a communication line such as a telephone line, a dedicated line and a satellite line, or any other serial transmission line. In this case, the speech input section 1 is only required to be provided with a modem and a DSU, or any other communication control section configured by a serial interface circuit. Furthermore, the speech input section 1 may acquire speech data and phoneme labeling data separately via different paths.

The speech input section 1 may be provided with a speech collector configured by a microphone, an AF amplifier, a sampler, an A/D converter, a PCM encoder and the like. The speech collector may acquire speech data by amplifying a speech signal indicating speech collected by its microphone, sampling and A/D converting the speech signal, and then PCM-modulating the speech signal for which sampling has been performed. The speech data to be acquired by the speech input section 1 is not necessarily required to be a PCM signal.

The method for the speech data division section 2 to divide original speech data into portions indicating individual phonemes may be any method. Accordingly, for example, original speech data may be divided for respective phonemes in advance. Alternatively, it is possible to divide pitch waveform data generated by the pitch waveform extraction section 3 into portions indicating individual phonemes and supply them to the similar waveform detection section 4 and the waveform equalization section 5. It is also possible to divide sub-band data generated by the orthogonal transform section 6 into portions indicating individual phonemes and supply them to the band control section 8. Furthermore, it is also possible to analyze speech data, pitch waveform data or sub-band data to identify a section indicating each phoneme and cut off the identified section.

The waveform equalization section 5 may supply pitch waveform data for which waveforms have been equalized to the nonlinear quantization section 9, and the nonlinear quantization section 9 may nonlinearly quantize each portion of the pitch waveform data, which indicates each phoneme, and supply it to the entropy coding section 10. In this case, the entropy coding section 10 may perform entropy coding of the nonlinearly quantized pitch waveform data and information about the number of samples, and supplies them to the bit stream forming section 11 in association with each other. The bit stream forming section 11 may treat the entropy-coded pitch waveform data as compressed speech data.

This pitch waveform extraction section 3 may not be provided with the cepstrum analysis section 301 (or the auto-correlation analysis section 302). In this case, the weight calculation section 303 may treat the inverse number of the fundamental frequency determined by the cepstrum analysis section 301 (or the auto-correlation analysis section 302) immediately as the average pitch length.

The zero-crossing analysis section 306 may supply a pitch signal supplied from the bandpass filter 305 immediately to the BPF coefficient calculation section 304 as a zero-crossing signal.

The compression table storage section 7 may acquire a compression table from the outside via a communication line or the like and store it. In this case, the compression table storage section 7 is only required to be provided with a modem and a DSU, or any other communication control section configured by a serial interface circuit.

Alternatively, the compression table storage section 7 may read a compression table from a storage medium on which the compression table is recorded and store it. In this case, the compression table storage section 7 is only required to be provided with a recording medium driver.

The compression rate data may be data which specifies the compression rate of sub-band data indicating each phoneme as an absolute value instead of a relative value. The compression table is not necessarily required to include priority data.

The bit stream forming section 11 may output compressed speech data or information about the number of samples to the outside via a communication line or the like. If data is outputted via a communication line, the bit stream forming section 11 is only required to be provided with a communication control section configured by a modem, a DSU and the like, for example.

The bit stream forming section 11 may be provided with a recording medium driver. In this case, the bit stream forming section 11 may write compressed speech data or information about the number of samples in a storage area of a recording medium set in the recording medium driver.

The nonlinear quantization section 9 may generate data indicating with which resolution each spectral component of sub-band data has been quantized. This data may be acquired, for example, by the bit stream forming section 11 so that the data is outputted to the outside or written in a storage area in a recording medium in the form of a bit stream.

A single serial interface circuit or recording medium driver may take on the function of the speech input section 1, the compression table storage section 7, the communication control section of the bit stream forming section 11 or the recording medium driver.

INDUSTRIAL APPLICABILITY

As described above, according to the present invention, there are realized a speech signal compression device, a speech signal compression method and a program for enabling efficient compression of data capacity of data indicating speech.

The invention claimed is:

1. A speech signal compression device comprising:

division-according-to-phoneme means for acquiring a speech signal indicating a speech waveform to be compressed, and dividing the speech signal waveform for individual phonemes;

a filter for filtering the divided speech signal to extract a pitch signal;

phase adjustment means for separating the speech signal into sections based on the pitch signal extracted by the filter and adjusting, for each of the sections, phase based on correlation relation among the separated speech signal and the pitch signal;

sampling means for determining, for each of the sections for which the phase has been adjusted by the phase adjustment means, the sampling length based on the phase and generating a sampling signal by performing sampling in accordance with the sampling length;

speech signal processing means for processing the sampling signal to be a pitch waveform signal based on the result of the adjustments by the phase adjustment means and the value of the sampling length;

sub-band data generation means for generating sub-band data indicating change with time of spectral distribution of each of the phonemes based on the pitch waveform signal; and compression-according-to-phoneme means for performing data compression of the sub-band data in accordance with a predetermined condition specified for a phoneme indicated by the sub-band data;

wherein the compression-according-to-phoneme means performs data compression of sub-band data by changing the sub-band data in such a manner as to delete a predetermined spectral component from the sub-band data.

2. The speech signal compression device according to claim 1, wherein the compression-according-to-phoneme means is configured by:

means for rewritably storing a table which specifies a condition of data compression to be performed for sub-band data indicating each phoneme; and means for performing data compression of sub-band data indicating each phoneme in accordance with a condition specified by the table.

3. The speech signal compression device according to claim 1 or 2, wherein the compression-according-to-phoneme means performs data compression of sub-band data indicating each phoneme by nonlinearly quantizing the data so that the compression rate to satisfy a condition specified for the phoneme is reached.

4. The speech signal compression device according to claim 1 or 2, wherein priority is specified for each spectral component of sub-band data; and the compression-according-to-phoneme means performs data compression of sub-band data by quantizing each of spectral components of the sub-band data in a manner that a spectral component with a higher priority is quantized with a higher resolution.

* * * * *